United States Patent
Fonkalsrud et al.

[11] Patent Number: 5,955,706
[45] Date of Patent: Sep. 21, 1999

[54] METHOD AND APPARATUS FOR CALCULATING WORK CYCLE TIMES

[75] Inventors: Andrew O. Fonkalsrud, Yorkville; Doyle G. Heyveld, Peoria; Eric A. Reiners, Saint Charles, all of Ill.

[73] Assignee: Caterpillar Inc., Peoria, Ill.

[21] Appl. No.: 08/979,885

[22] Filed: Nov. 26, 1997

[51] Int. Cl.[6] .................................................. G01G 19/08
[52] U.S. Cl. ............................ 177/136; 177/141; 701/50
[58] Field of Search .................................... 177/136, 137, 177/138, 139, 141; 701/29, 35, 50

[56] References Cited

U.S. PATENT DOCUMENTS

| | | | |
|---|---|---|---|
| 5,067,572 | 11/1991 | Kyrtsos et al. | 177/139 |
| 5,070,953 | 12/1991 | Kyrtsos et al. | 177/25.14 |
| 5,082,071 | 1/1992 | Kyrtsos et al. | 177/25.14 |
| 5,105,895 | 4/1992 | Kyrtsos | 177/25.14 |
| 5,650,928 | 7/1997 | Hagenbuch | 701/35 |
| 5,714,719 | 2/1998 | Otsuka et al. | 177/25.11 |
| 5,742,914 | 4/1998 | Hagenbuch | 701/35 |

OTHER PUBLICATIONS

Patent Application Serial No. 18/769282, Filed Dec. 18, 1996, Shot–Rock Diggability Monitor, Docket No. 95–548.

*Primary Examiner*—Randy W. Gibson
*Attorney, Agent, or Firm*—W. Bryan McPherson

[57] ABSTRACT

In one aspect of the present invention, a method for determining the work cycle of an earth moving machine is disclosed. The machine has a transmission, a work implement, and a lift cylinder and a tilt cylinder connected to the work implement. The method includes the steps of determining a lift cylinder head end pressure, a displacement of the lift cylinder, a displacement of the tilt cylinder, and a direction of travel of the machine. The method further includes determining the work cycle of the machine in response to the displacement of the tilt and lift cylinders, and the lift cylinder head end pressure.

24 Claims, 4 Drawing Sheets

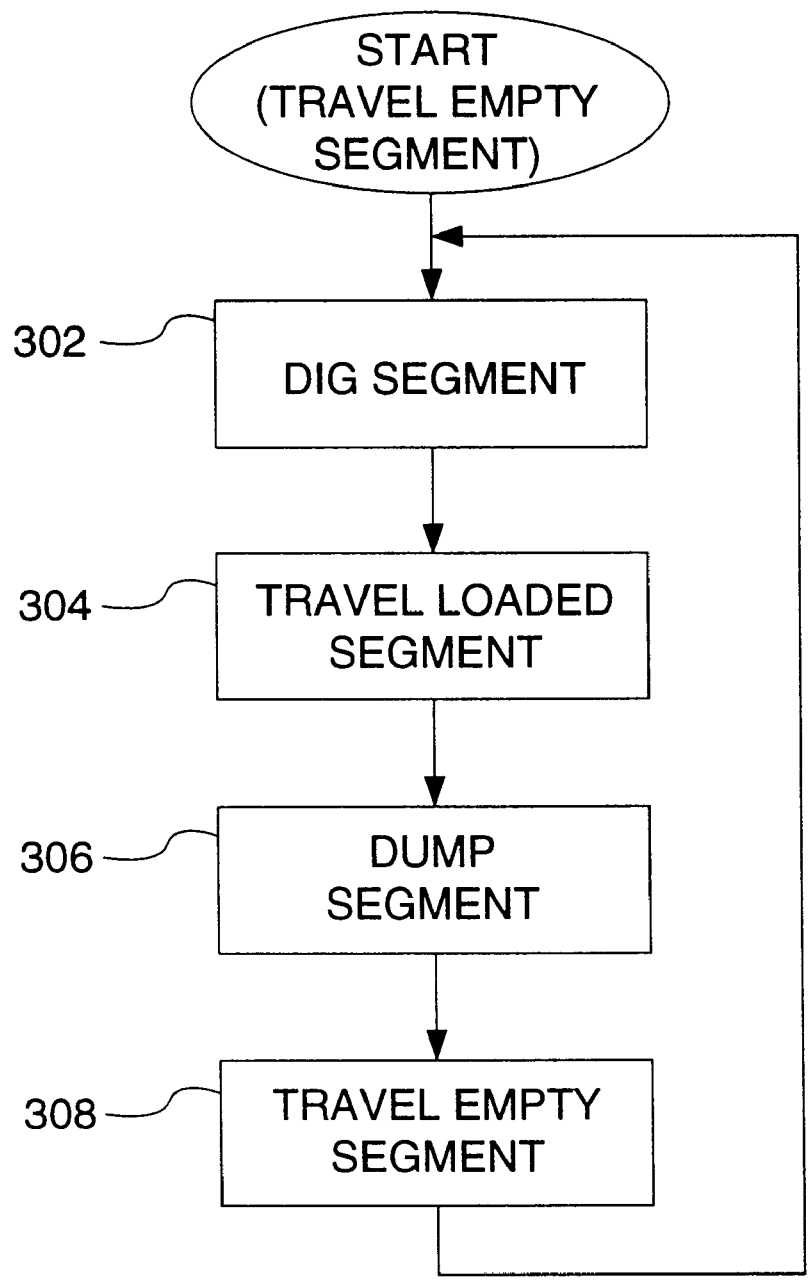
Fig_3_

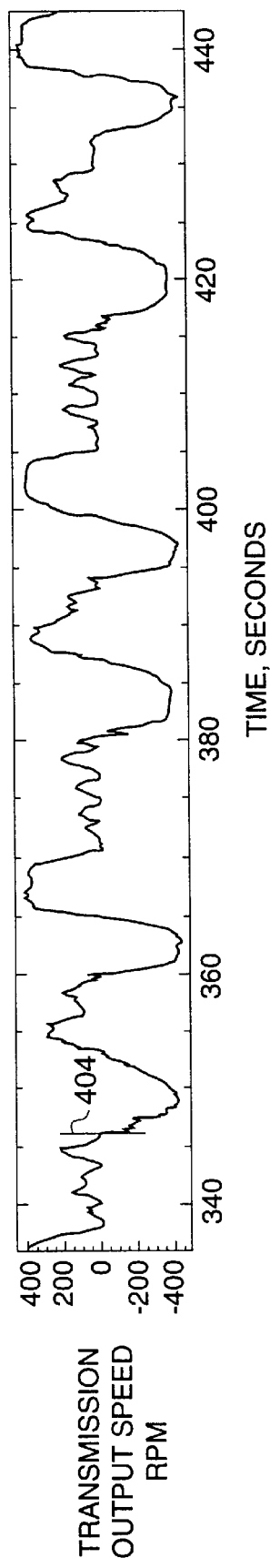
Fig-4d-
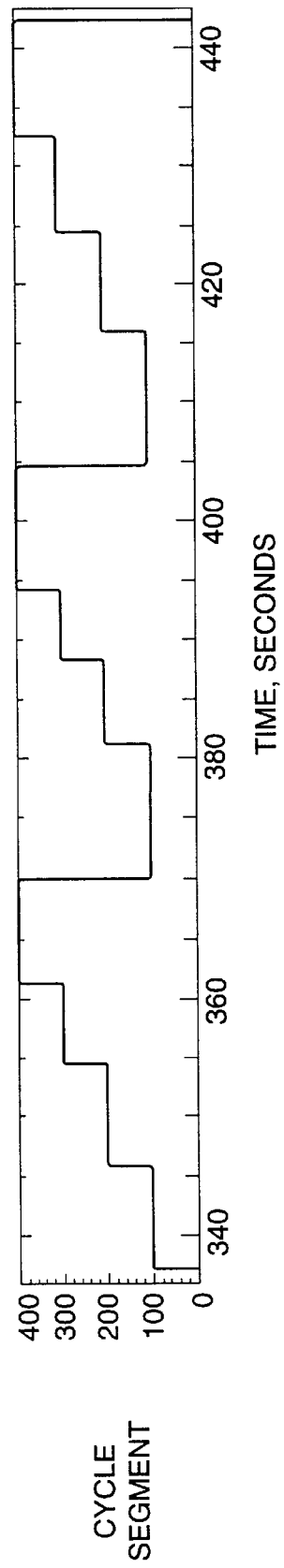
Fig-4e-

METHOD AND APPARATUS FOR CALCULATING WORK CYCLE TIMES

TECHNICAL FIELD

The present invention relates generally to earth moving machines, and more particularly, to a method and apparatus for calculating work cycle times for an earth moving machine.

BACKGROUND ART

Earth moving machines such as front wheel loaders are used generally to transfer bulk material from a stock pile onto transport vehicles such as trucks or railroad cars. In such vehicle loading applications, the loader performs a series of functions, including digging, racking back the bucket to maintain the load, traveling to a dump site or transport vehicle while raising the bucket, dumping the load from a raised position and traveling with an empty bucket back to the original stock pile.

A method and apparatus for determining the work cycle of a machine is needed to increase productivity and efficiency of the machine. The ability to determine the work cycle time by an automated on-board system is needed to integrate with other machine monitoring systems in order to provide the operator of the machine important information regarding the efficiency and progress of the machine.

The present invention is directed to overcome one or more of the problems set forth above.

DISCLOSURE OF THE INVENTION

In one aspect of the present invention, a method for determining the work cycle of an earth moving machine is disclosed. The machine has a transmission, a work implement, and a lift cylinder and a tilt cylinder connected to the work implement. The method includes the steps of determining a lift cylinder head end pressure, a displacement of the lift cylinder, a displacement of the tilt cylinder, and a direction of travel of the machine. The method further includes determining the work cycle of the machine in response to the displacement of the tilt and lift cylinders, and the lift cylinder head end pressure.

In another embodiment of the present invention, an apparatus for determining the work cycle of an earth moving machine is disclosed. The earth moving machine has a transmission, a work implement, and a lift cylinder and a tilt cylinder connected to the work implement. The apparatus includes a first lift cylinder sensing means for sensing a lift cylinder head end pressure and responsively producing a lift cylinder pressure signal, a second lift cylinder sensing means for sensing a displacement of said lift cylinder and responsively producing a lift cylinder displacement signal, a tilt cylinder sensing means for sensing a displacement of said tilt cylinder and responsively producing a tilt cylinder displacement signal, and a direction sensing means for sensing a direction of travel of said earth moving machine and responsively generating a direction signal. In addition, a processing means receives the lift cylinder pressure signal, the lift cylinder displacement signal, the tilt cylinder displacement signal, the direction signal, and responsively determines said the cycle in response to the tilt cylinder displacement signal, lift cylinder displacement signal, and lift cylinder head end pressure signal.

BRIEF DESCRIPTION OF THE DRAWINGS

FIG. 3 is a flow diagram of the work cycle broken down into the individual segments of the work cycle.

BEST MODE FOR CARRYING OUT THE INVENTION

Figure 1:
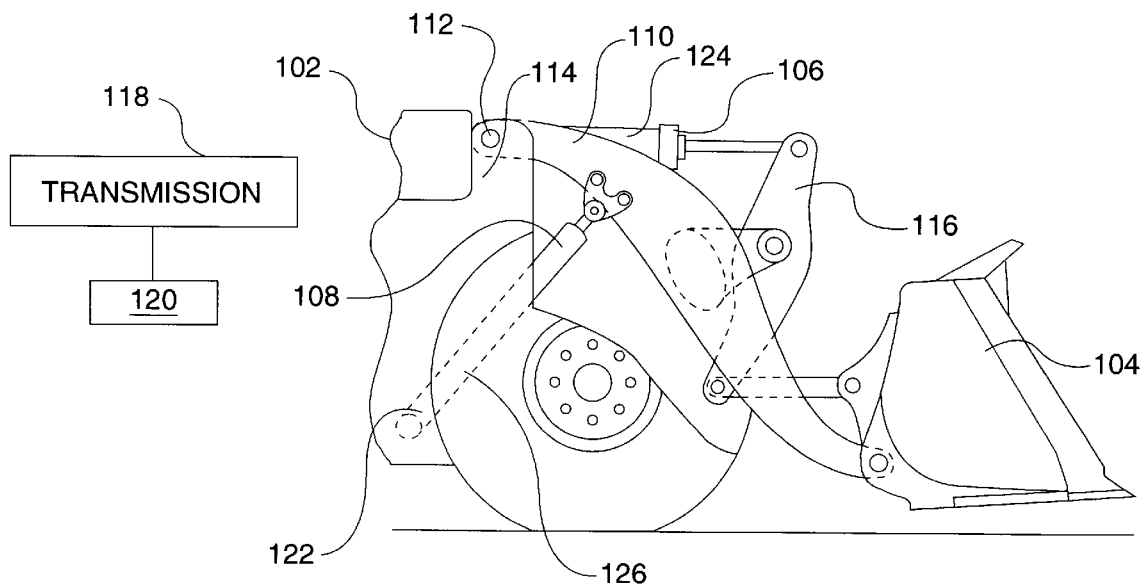
FIG. 1 is a side view of the forward portion of a loader vehicle.

The present invention includes a method and apparatus for determining the work cycle of an earth moving machine, such as the machine shown in FIG. 1. Although FIG. 1 illustrates a forward portion of a wheel type loader machine 102 having a payload carrier in the form of a bucket 104, the present invention is equally applicable to machines such as track type loaders, and other machines having similar loading implements. The bucket 104 of the machine 102 is connected to a lift arm assembly 110, which is pivotally actuated by two hydraulic lift cylinders 108 (only one of which is shown) about a pair of lift arm pivot pins 112 (only one of which is shown) attached to the frame of the machine 102. The bucket 104 is also attached to a tilt arm assembly 116, which is pivotally actuated by a tilt cylinder 106.

A first lift cylinder sensing means 122, such as a pressure transducer, senses the hydraulic pressure in the lift cylinder 108 and responsively generates a lift cylinder pressure signal. A second lift cylinder sensing means, such as a displacement sensor located in the lift cylinder 108, senses the displacement of the lift cylinder and responsively generates a lift cylinder displacement signal. In addition, a tilt cylinder sensing means 124, such as a tilt displacement sensor, senses the displacement of the tilt cylinder 106 and responsively generates a tilt cylinder displacement signal. A direction sensing means 120 is used for determining the direction of travel of the machine 102, and generates a direction signal. In the preferred embodiment, the direction sensing means 120 includes a transmission speed sensor located in the transmission 118. The transmission speed sensor 120 senses the rotational output speed of the transmission 118.

Figure 2:
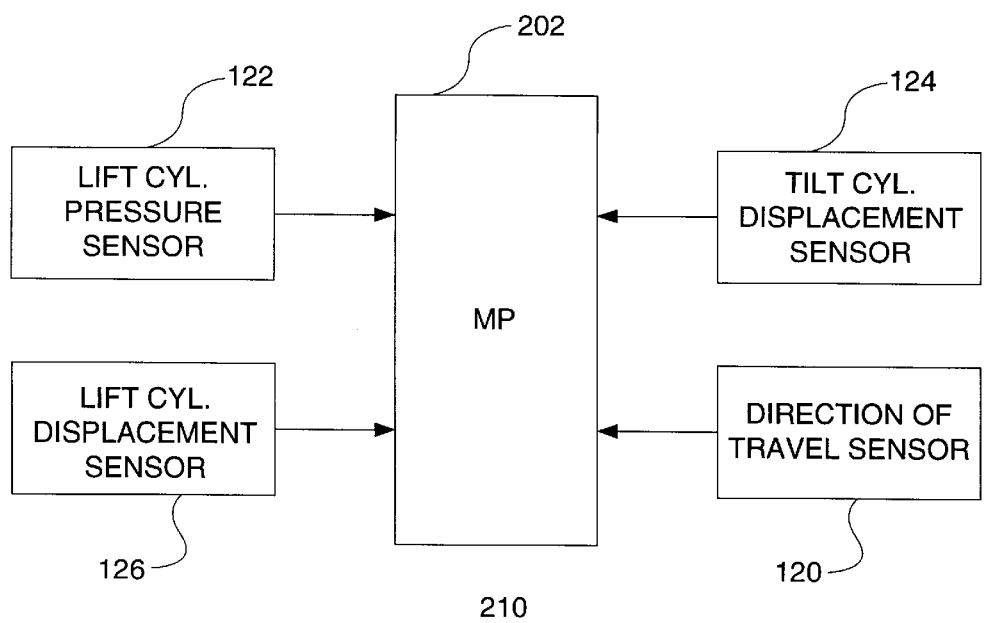
FIG. 2 is a block diagram of an embodiment of the present invention.

One embodiment of the present invention is encompassed by the system 210, illustrated in FIG. 2. A processing means 202, such as a microprocessor, receives the lift cylinder pressure signal, lift cylinder displacement signal, tilt cylinder displacement signal, and direction signal, and responsively determines a work cycle for the machine 102.

The work cycle of the machine 102 includes a dig segment, a travel loaded segment, a dump segment, and a travel empty segment. The dig segment is defined as the portion of the cycle when the machine 102 is involved in digging. Once the machine 102 has sufficiently loaded the bucket 104 the machine transitions into the travel loaded segment. The travel loaded segment is defined as the portion of the work cycle when the machine 102 is traveling to another destination to dump the material in the bucket 104. Once the machine 102 arrives at the appropriate destination, the machine 102 proceeds to dump the contents of the bucket 104, which describes the dump segment. After dumping the contents of the bucket 104, the machine 102 returns to the digging location during the travel empty segment. FIG. 3 represents a flow diagram for the work cycle.

In the preferred embodiment, the machine 102 sequentially steps through the segments of the work cycle. Once it is determined that the machine 102 is in a particular segment of the work cycle, the appropriate parameters are monitored to determine when the next segment begins. For example, once the determination is made that the travel empty segment has begun, the appropriate parameters are monitored to determine when the dig segment begins.

Figure 4A:
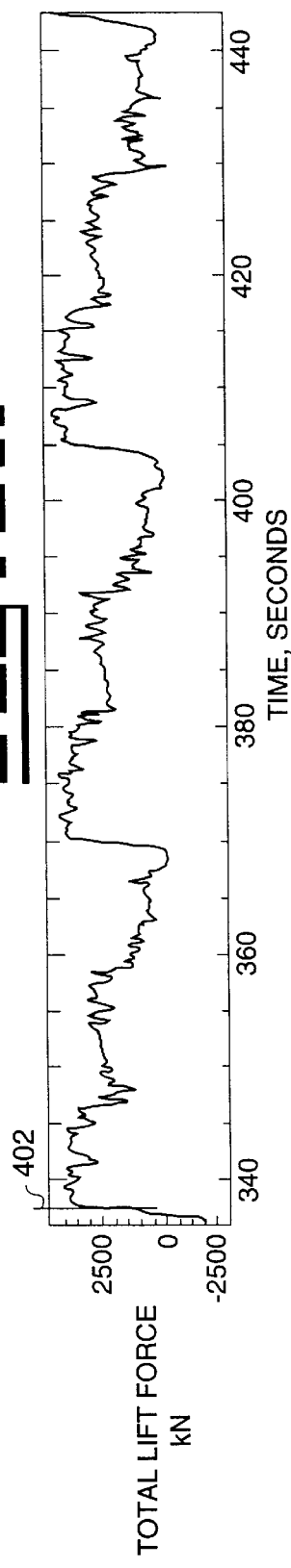
FIG. 4 is a graphical representation of the total lift force, lift cylinder displacement, tilt cylinder displacement, and transmission output speed as they are correlated with the work cycle and in particularly with the individual segments of the work cycle.
Figure 4B:
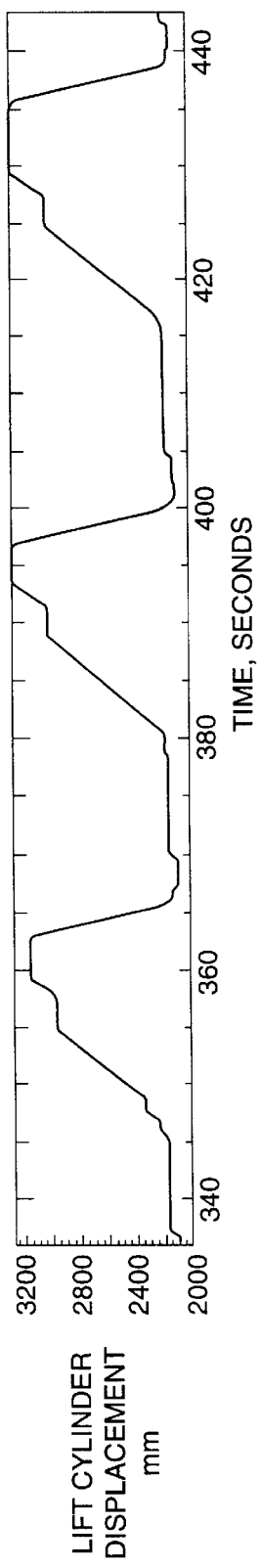
Figure 4C:
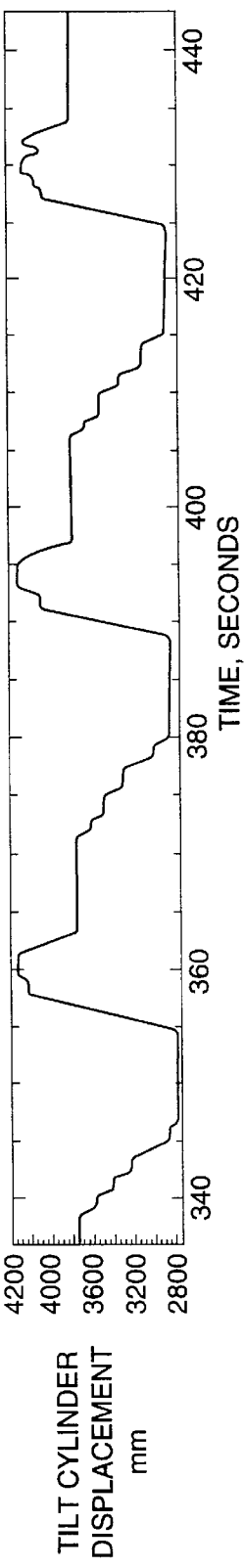

When the machine 102 is started, the system 210 initializes to the travel empty segment. However, it is possible for the operator of the machine 202 to change the initial state of the system 210. For example, a switch (not shown) may be provided to enable the operator to toggle through the segments of the work cycle until the appropriate segment is entered. While the machine work cycle is in the travel empty segment, the system 210 monitors the appropriate parameters to determine when the machine 102 transitions to the dig segment. The dig segment is detected when, during the travel empty segment, the total lift cylinder force rapidly increases (or spikes 402), as shown in FIG. 4-A. For example, as the machine enters a pile of material, the lift cylinder force rapidly changes. The magnitude of the total lift force must exceed a pre-determined value, e.g. 2500 K.N., before the work cycle is said to transition to the dig segment. The total lift cylinder force may be calculated as:

TLF=LP*(LHA*NumLC)

Where:

TLF=Total Lift Cylinder Force

LP=Lift Cylinder Pressure

LHA=Lift Cylinder Head Area

NumLC=Number of Lift Cylinders

Once the dig segment is detected, the system 210 begins to monitor the appropriate parameters to detect the beginning of the travel loaded segment. The travel loaded segment is detected when, during the dig segment, the direction of travel changes from a forward to a reverse direction and the lift cylinder displacement is below a pre-determined value, e.g., 55% of the distance to the maximum lift height. In the preferred embodiment, the change in direction is detected by monitoring the transmission output speed. The change of direction from forward to reverse occurs when the transmission output speed changes direction from positive to negative, shown at a first crossover 404 in FIG. 4-D.

Once the travel loaded segment has been detected, the present invention begins monitoring for the beginning of the dump segment. The start of the dump segment occurs when, during the travel loaded segment, the tilt cylinder velocity exceeds a pre-determined value. In the preferred embodiment, the start of the dump segment begins when any tilt cylinder velocity is detected, i.e., the tilt cylinder velocity exceeds zero. The tilt cylinder velocity is determined by differentiating and filtering the tilt cylinder displacement. In an alternative embodiment, the dump segment may be determined when the tilt cylinder displacement exceeds a pre-determined value, such as 3000 mm., as shown in FIG. 4-C. In another embodiment, the dump segment may be detected by monitoring the tilt command input by the operator. That is, when the current segment of the work cycle is the travel while loaded segment, the dump segment can be detected when the operator inputs a positive tilt command.

Once the dump segment is detected, the system 210 begins monitoring the appropriate parameters to determine the beginning of the travel empty segment. The beginning of the travel empty segment occurs when, during the dump segment, the direction of travel changes from a forward to a reverse direction, and the lift cylinder displacement is above a pre-determined value. In the preferred embodiment the pre-determined level is 55% of the distance to the maximum lift height.

By monitoring the given parameters, the individual segments of a work cycle may be determined; and therefore, the work cycle of the machine 102 may be determined, as shown in the work cycle plot illustrated in FIG. 4E.

There are alternative parameters which may be monitored to determine the beginning of the segments. For example, the direction of travel of an earth moving machine may also be determined by monitoring the ground speed. In addition, transmission solenoid commands may be monitored to determine whether a forward or reverse gear is being selected, which indicates the direction of travel the machine is being commanded.

Industrial Applicability

With reference to the drawings and in operation, the present invention provides a method and apparatus for determining the work cycle of an earth moving machine 102. The method includes determining the work cycle in response to the direction of travel of the machine 102, the tilt cylinder displacement, the lift cylinder displacement, and either the total lift force or the lift cylinder head end pressure.

The work cycle includes a dig segment, travel loaded segment, dump segment, and travel empty segment. By monitoring and analyzing lift cylinder pressure and displacement, tilt cylinder displacement, and direction of travel, a determination can be made regarding the beginning of each of the individual segments of the work cycle. Determining the time spent performing each of the individual segments will enable productivity data to be collected by an onboard or off board operator of the machine to determine efficiency of the machine, progress through a work site, or predict future development times on a work site.

Other aspects, objects, advantages and uses of the present invention can be obtained from a study of the drawings, disclosures and appended claims.

We claim:

1. A method for determining the segments of a work cycle of an wheel loader, said wheel loader having a transmission, a work implement, a lift cylinder connected to said work implement, and a tilt cylinder connected to said work implement, the lift and tilt cylinders each having a rod end and a head end, comprising the steps of:

determining a current segment of the work cycle;

determining one of a lift cylinder head end pressure, a lift cylinder displacement, and a tilt cylinder displacement in response to said current segment;

determining a direction of travel of said earth moving machine; and, determining a beginning of a next segment of said work cycle in response to said direction of travel, said current segment, and said one of said tilt cylinder displacement, said lift cylinder displacement, and said lift cylinder head end pressure, and wherein said work cycle includes a dig segment, a travel loaded segment, a dump segment, and a travel empty segment.

2. A method as set forth in claim 1, wherein the step of determining a lift cylinder head end pressure includes determining a total lift force in response to said lift cylinder head end pressure.

3. A method as set forth in claim 2, wherein the step of determining said work cycle includes determining said work cycle in response to said direction of travel, said lift and tilt cylinder displacement, and said total lift force.

4. A method as set forth in claim 1, wherein the step of determining a direction of travel of said earth moving machine further comprises determining an output speed of said transmission.

5. A method as set forth in claim 1, wherein said step of determining said next segment of said work cycle further comprises the step of determining a beginning of said dig segment in response to said lift cylinder head end pressure and said current segment being said travel empty segment.

6. A method as set forth in claim 5, wherein the step of determining said work cycle further comprises the step of determining the beginning of said travel loaded segment in response to said direction of travel, said lift cylinder displacement and said current segment being said dig segment.

7. A method as set forth in claim 6, wherein the step of determining said work cycle further comprises the step of determining the beginning of said dump segment in response to said tilt cylinder displacement and said current segment being said travel loaded segment.

8. A method as set forth in claim 7, wherein the step of determining said work cycle further comprises the step of determining the beginning of said travel empty segment in response to said current segment being said dump segment, said direction of travel and said lift cylinder displacement.

9. A method as set forth in claim 5, wherein the step of determining the beginning of said dig segment further comprises determining the beginning of said dig segment in response to a current segment of said work cycle being said travel empty segment and said lift cylinder head end pressure being less than a first pre-determined value.

10. A method as set forth in claim 6, wherein the step of determining the beginning of said travel loaded segment further comprises determining the beginning of said travel loaded segment in response to a current segment of said work cycle being said dig segment and said direction of travel being a reverse direction and said lift cylinder displacement being less than a second pre-determined value.

11. A method as set forth in claim 7, wherein the step of determining the beginning of said dump segment includes determining the beginning of said dump segment in response to said current segment of said work cycle being said travel loaded segment and determining a velocity of said tilt cylinder.

12. A method as set forth in claim 8, wherein the step of determining the beginning of said travel empty segment includes determining the beginning of said travel empty segment in response to a current segment of said work cycle being a dump segment and said direction of travel being a reverse direction, and said lift cylinder displacement being one of greater than and equal to a second predetermined value.

13. An apparatus for determining the segments of a work cycle of an wheel loader, said wheel loader having a transmission, a work implement, a lift cylinder connected to said work implement, and a tilt cylinder connected to said work implement, the lift and tilt cylinders each having a rod end and a head end, comprising:

a first lift cylinder sensing means for sensing a lift cylinder head end pressure and responsively producing a lift cylinder pressure signal;

a second lift cylinder sensing means for sensing a displacement of said lift cylinder and responsively producing a lift cylinder displacement signal;

a tilt cylinder sensing means for sensing a displacement of said tilt cylinder and responsively producing a tilt cylinder displacement signal;

a direction sensing means for sensing a direction of travel of said earth moving machine and responsively generating a direction signal; and, a processing means for receiving said lift cylinder pressure signal, said lift cylinder displacement signal, said tilt cylinder displacement signal, and said direction signal, determining a current segment of the work cycle, and responsively determining a next segment of said work cycle in response to said direction of travel signal, said tilt cylinder displacement signal, said lift cylinder displacement signal, said lift cylinder head end pressure signal, and said current segment of said work cycle, wherein said work cycle includes a dig segment, a travel loaded segment, a dump segment, and a travel empty segment.

14. An apparatus as set forth in claim 13 wherein said processing means further comprises determining a total lift force in response to said lift cylinder head end pressure signal, and determining said work cycle in response to said total lift force, said direction signal, said lift cylinder displacement signal, and said tilt cylinder displacement signal.

15. An apparatus as set forth in claim 13, wherein said means for sensing a direction of travel of said earth moving machine further comprises determining an output speed of said transmission.

16. An apparatus as set forth in claim 13, said processing means further comprises determining a beginning of said dig segment in response to said lift cylinder head end pressure signal.

17. An apparatus as set forth in claim 16, wherein said processing means further comprises determining the beginning of said travel loaded segment in response to said direction of travel and said lift cylinder displacement.

18. An apparatus as set forth in claim 17, wherein said processing means further comprises determining the beginning of said dump segment in response to said tilt cylinder displacement.

19. An apparatus as set forth in claim 18, wherein said processing means further comprises determining the beginning of said travel empty segment in response to said direction of travel and said lift cylinder displacement.

20. An apparatus as set forth in claim 19, wherein said processing means further comprises determining the beginning of said dig segment in response to a current segment of said work cycle being said travel empty segment and said lift cylinder head pressure is less than a first pre-determined value.

21. An apparatus as set forth in claim 17, wherein said processing means further comprises determining the beginning of said travel loaded segment in response to a current segment of said work cycle being said dig segment and said direction of travel being a reverse direction, and said lift cylinder displacement being less than a second predetermined value.

22. An apparatus as set forth in claim 18, wherein said processing means further includes determining the beginning of said dump segment in response to a current segment of said work cycle being said travel loaded segment, and determining a velocity of said tilt cylinder.

23. An apparatus as set forth in claim 19, wherein said processing means further includes determining the beginning of said travel empty segment in response to a current segment of said work cycle being said dump segment, and said direction of travel being a reverse direction, and said lift cylinder displacement being one of greater than and equal to a second pre-determined value.

24. An apparatus for determining the segments of a work cycle of an wheel loader, said wheel loader having a transmission, a work implement, a lift cylinder connected to said work implement, and a tilt cylinder connected to said work implement, the lift and tilt cylinders each having a rod end and a head end, comprising:

a first lift cylinder sensor adapted to sense a lift cylinder head end pressure and responsively produce a lift cylinder pressure signal;

a second lift cylinder sensor adapted to sense a displacement of said lift cylinder and responsively produce a lift cylinder displacement signal;

a tilt cylinder sensor adapted to sense a displacement of said tilt cylinder and responsively produce a tilt cylinder displacement signal;

a direction sensor adapted to sense a direction of travel of said earth moving machine and responsively generate a direction signal; and, a process system adapted to receive said lift cylinder pressure signal, said lift cylinder displacement signal, said tilt cylinder displacement signal, and said direction signal, determine a current segment of the work cycle, and responsively determine a next segment of said work cycle in response to said direction of travel signal, said tilt cylinder displacement signal, said lift cylinder displacement signal, said lift cylinder head end pressure signal, and said current segment of said work cycle, wherein said work cycle includes a dig segment, a travel loaded segment, a dump segment, and a travel empty segment.

* * * * *